(12) United States Patent
Zimmermann et al.

(10) Patent No.: US 8,756,787 B2
(45) Date of Patent: Jun. 24, 2014

(54) METHOD OF ESTABLISHING A PRESS FIT OF A COMPONENT ON A SHAFT

(75) Inventors: Martin Zimmermann, Zofingen (CH); Arnold Teimel, Giswil (CH)

(73) Assignee: Maxon Motor AG, Sachseln (CH)

( * ) Notice: Subject to any disclaimer, the term of this patent is extended or adjusted under 35 U.S.C. 154(b) by 619 days.

(21) Appl. No.: 12/961,022

(22) Filed: Dec. 6, 2010

(65) Prior Publication Data
US 2011/0138604 A1  Jun. 16, 2011

(30) Foreign Application Priority Data

Dec. 15, 2009 (EP) .................................. 09179247

(51) Int. Cl.
*B23P 11/02* (2006.01)

(52) U.S. Cl.
USPC .......................... 29/446; 29/898.054; 384/296

(58) Field of Classification Search
USPC .............. 29/525, 898.054; 384/282–296, 569
See application file for complete search history.

(56) References Cited

U.S. PATENT DOCUMENTS

| | | | | |
|---|---|---|---|---|
| 4,377,736 | A * | 3/1983 | Daunt et al. | 219/121.68 |
| 4,729,766 | A * | 3/1988 | Bergentz et al. | 600/36 |
| 4,760,752 | A * | 8/1988 | Wield et al. | 74/434 |
| 4,806,731 | A | 2/1989 | Bragard et al. | |
| 6,312,160 | B1 * | 11/2001 | Sugiyama | 384/420 |
| 6,554,643 | B1 * | 4/2003 | Whiting | 439/571 |
| 8,393,798 | B2 * | 3/2013 | Nakagawa et al. | 384/544 |
| 8,408,800 | B2 * | 4/2013 | Hagan | 384/296 |
| 2006/0283642 | A1 * | 12/2006 | Hickam | 180/65.1 |
| 2009/0134131 | A1 | 5/2009 | Lee et al. | |
| 2011/0138604 | A1 * | 6/2011 | Zimmermann et al. | 29/446 |

FOREIGN PATENT DOCUMENTS

| | | |
|---|---|---|
| CN | 1402871 A | 3/2003 |
| CN | 1540177 A | 10/2004 |
| DE | 37 41 497 A1 | 6/1989 |
| DE | 101 55 491 A1 | 5/2003 |
| DE | 10 2006 026551 A1 | 12/2007 |
| EP | 0 280 671 A2 | 8/1988 |

(Continued)

OTHER PUBLICATIONS

Office Action (Notification of First Office Action) dated Nov. 1, 2012, issued in corresponding Chinese Patent Application No. 201010593464.X and an English Translation thereof. (13 pages).

(Continued)

*Primary Examiner* — Minh Trinh
(74) *Attorney, Agent, or Firm* — Buchanan Ingersoll & Rooney PC

(57) ABSTRACT

The present invention relates to a method of establishing a press fit of a component with a mounting hole on a shaft. It aims at providing a method that allows exact positioning of the component to be mounted on the shaft as well as a flexible way of use. To this end, the method is so conceived that an inner surface of the mounting hole of the component and/or a circumferential surface of the shaft is/are partially fused so that calotte-shaped projections protruding beyond the inner surface of the mounting hole and/or the circumferential surface of the shaft will form, that the component and/or the shaft is/are subsequently cooled, so that the calotte-shaped projections will solidify, and that the component is then slipped onto the shaft until the mounting hole is positioned in a fastening area of the shaft. In addition, the present invention also relates to components for establishing a press fit of a shaft-hub connection.

20 Claims, 2 Drawing Sheets

(56) References Cited

FOREIGN PATENT DOCUMENTS

| EP | 1 387 734 A2 | 2/2004 | | |
|---|---|---|---|---|
| JP | 2000324753 A | * | 11/2000 | ............... H02K 7/08 |
| WO | WO 01/41136 A1 | 6/2001 | | |
| WO | WO 02/094497 A2 | 11/2002 | | |

OTHER PUBLICATIONS

Search Report issued on May 25, 2010, by European Patent Office for Application No. 09179247.

* cited by examiner

METHOD OF ESTABLISHING A PRESS FIT OF A COMPONENT ON A SHAFT

The present invention relates to a method of establishing press fit of a component with a mounting hole on a shaft, in particular a shaft for a micro motor. In addition, the present invention also relates to a shaft-hub connection element provided with a joining surface for establishing a press fit with a second shaft-hub connection element having a contact surface.

In the field of drive technology it is often necessary to precisely position drive elements, such as pinions, toothed belt disks or ball bearings, at a specific position on the drive shaft of the rotor. Up to now, a plurality of different methods has been used for this purpose.

One well-known possibility was to tolerance the shaft and the hole of the component to be positioned such that a direct tight fit is established. In the case of motor shafts this means in some cases long pressing distances entailing the risk that the shaft may buckle, or special shafts which are offset for the purpose of press fitting; this leads to higher manufacturing costs and, due to the manufacturing technology, also to disadvantages with respect to true running relative to the offset area.

Furthermore, it is also known to slip the component to be positioned onto the shaft and to fix it thereon by an adhesive bond or by laser welding. To this end, an additional ring, made e.g. of plastic material, is often used, which is also tightly fitted on the shaft, but can be displaced easily. By means of this additional ring the component to be positioned, i.e. the pinion or the ball bearing, is retained during the fixing process, i.e. during the adhesive bonding or welding process. This additional component entails additional part costs, requires installation space as well as an additional mounting operation.

It is also known to deform the hole of the component to be positioned on the shaft through embossing. In this case, the component to be positioned can only be displaced on the shaft when a force is applied thereto. This necessitates the use of correspondingly precise embossing tools.

In addition, a shrink-on method is known as well. In the case of the shrink-on method, the component to be positioned is first heated so that the hole of said component widens in accordance with the coefficient of thermal expansion. The component to be positioned can thus easily be slipped onto the shaft. Subsequently, the component to be positioned cools down at the desired position and contracts, so that the component will be tightly fitted at the desired position. For shafts having a diameter in the range of <5 mm, a technical realization of this method is hardly possible due to the high demands on the tolerances of the components.

It is therefore the object of the present invention to provide a method allowing, also in the case of small components, exact positioning of the components to be mounted on the shaft as well as a flexible way of use.

To this end, the method according to the present invention is so conceived that it comprises the following steps:
  partially fusing an inner surface of the mounting hole of the component and/or a circumferential surface of the shaft so that calotte-shaped projections protruding beyond the inner surface of the mounting hole and/or the circumferential surface of the shaft will form,
  cooling the component and/or the shaft, so that the calotte-shaped projections will solidify, and
  slipping the component onto the shaft until the mounting hole is positioned in a fastening area of the shaft.

The term "press fit" means here that the diameter of the mounting hole of the component is smaller than the outer diameter of the shaft in the area in which the component is to be fixed to the shaft. If the diameter of the hole is much smaller than the diameter of the shaft, the component can only be applied to the respective location on the shaft by a substantial expenditure of energy. The component is then connected to the shaft by a non-positive connection, a tight fit is established. If the diameter of the mounting hole of the component is only slightly smaller than the diameter of the shaft in the fastening area, a minor expenditure of energy will suffice for slipping the component onto the shaft and the component will only be fixed in position in said fastening area. This is referred to as medium fit.

In accordance with the method according to the present invention, the material of the component in the mounting hole or on the circumferential surface of the shaft is locally liquefied. The surface tension of the melt has the effect that the molten material will contract in a drop-shaped manner. During cooling, the melt drops solidify and calotte-shaped projections are formed.

The use of the method according to the present invention results in the formation of spots on the inner surface of the mounting hole and/or on the circumferential surface of the shaft, said spots protruding beyond the surfaces in question. This means that the diameter of the shaft is locally enlarged and/or the diameter of the mounting hole is locally reduced. This has the effect that, in this area, a friction-type, i.e. a non-positive connection is established between the shaft and the component. The component can easily be displaced in the other areas of the shaft, where no contact exists between the shaft and the component. The component to be positioned can thus be positioned precisely on the shaft. In addition, the method is flexible in use, the desired fastening area can easily be established. If necessary, a plurality of fastening areas can be formed on the shaft. The use of additional mounting aids for fixing the component to the shaft is not necessary. Furthermore, the available space is utilized in the best possible way. This fastening method can be executed without the necessity of using wear-prone mechanical forming tools. Since it is not necessary to produce any offset portions on the shaft, the shaft can be manufactured at a comparatively low price and good true running properties of the shaft are accomplished. The component is a hub member, e.g. a pinion, a toothed belt disk, a ball bearing or the like.

According to an advantageous embodiment, the component or the shaft can be irradiated with a laser beam at certain points thereof for the purpose of fusing. The use of a laser beam allows precise positioning. The fusion points can be produced precisely at the desired position on the shaft and/or in the mounting hole of the component.

A further variant of the method can be so conceived that the inner surface of the mounting hole of the component and/or the circumferential surface of the shaft are fused at a plurality of points. The fit can thus be established easily, and a reliable connection between the component and the shaft can be realized by producing a suitable number of projections on the circumference of the shaft and/or of the hole. In addition, the pressing force is distributed over a plurality of connection points between the shaft and the hole so that the load applied to the shaft and the hole will be rendered more uniform.

According to still another method variant the supply of power by means of the laser beam can be adjusted such that the resultant calotte-shaped projections lead to the desired change in the circumference of the mounting hole of the component and/or in the circumference of the shaft. By changing the power of the laser beam, the size of the fused spots can easily be varied so that projections having the desired height will be produced and the desired pressing force will be accomplished in this way. It follows that, making use of the method according to the present invention, it is very easily possible to treat the component and/or the shaft such that the desired pressing force for the press fit between the component and the shaft will be achieved. If comparatively little power is supplied by means of the laser beam, comparatively small areas will be fused and the calotte-shaped projections formed will be comparatively small, which means that also the resultant joining force between the shaft and the component will be smaller. If more power is supplied by means of the laser beam, larger areas of the shaft and/or of the component will be fused and the calotte-shaped projections formed will be larger, which means that there will also be an increase in the joining force between the shaft and the component.

Furthermore, the method may also be so conceived that the component is additionally fixed to the shaft by a substance-to-substance bond. The component may, for example, be additionally connected to the shaft through adhesive bonding, welding or soldering. This has the effect that even in the case of very small components, the component in question will reliably be retained on the shaft.

According to an advantageous embodiment, the method may also be so conceived that the calotte-shaped projections are arranged such that they are distributed over the circumference of the mounting hole and of the shaft, respectively. Hence, a uniform spaced fit between the shaft and the component is established. This leads to good stress distribution between the component and the shaft, mounting can be carried out more easily and good true running properties of the shaft are accomplished.

According to an expedient embodiment, the method may also be so conceived that a plurality of juxtaposed rows of calotte-shaped projections is formed in the mounting hole or on the shaft. This has the effect that a press fit will be established only in certain areas between the component and the shaft. Thin-walled and/or sensitive areas of the component to be positioned can be arranged outside of the pressing zone and are therefore not impaired with respect to their dimensional stability. If the component to be positioned should be a ball bearing, the raceway of the balls should be positioned outside of the pressing zone.

The present invention additionally relates to a shaft-hub connection element for use in the method according to the present invention. It is here once more the object of the present invention to provide a shaft-hub connection element that allows exact positioning of the components to be mounted on the shaft as well as a flexible way of use.

According to the present invention, the shaft-hub connection element is so conceived that it is provided with a joining surface for establishing a press fit with a second shaft-hub connection element having a contact surface, and that calotte-shaped projections protruding beyond the surface of the shaft-hub connection element are formed in the area of the joining surface.

The diameter of the first shaft-hub connection element is, as an area of the joining surface, locally modified, i.e. a friction-type connection with the second shaft-hub connection element can be established in the area of the joining surface. It is thus possible to position the two components precisely relative to one another, the use is very flexible. Additional mounting aids are not necessary, and the available space can be utilized in the best possible way. Mounting can be executed without making use of any wear-prone mechanical forming tools, offset portions need not be produced on the shaft. Hence, the shaft can be manufactured at a comparatively low price and good true running properties of the shaft are accomplished.

An advantageous embodiment can be so conceived that the shaft-hub connection element is a shaft, in particular a shaft for a micro motor, that the joining surface with the calotte-shaped projections is formed on the circumferential surface of the shaft, and that the second shaft-hub connection element is a hub member with a mounting hole configured as a contact surface. This means that, in this case, the projections are arranged on the shaft. This is advantageous insofar as the shaft is easy to process.

However, another embodiment may also be so conceived that the first shaft-hub connection element is a hub member, that the joining surface with the calotte-shaped projections is formed in the interior of a mounting hole, and that the second shaft-hub connection element is a shaft having the contact surface formed on its circumferential surface. This variant is advantageous insofar as the shaft need not be processed and the true running properties of the shaft will thus not be influenced.

Still another embodiment may be so conceived that the calotte-shaped projections are distributed over the circumference of the shaft and of the mounting hole of the hub member, respectively, i.e. the press fit is established uniformly over the circumference of the shaft and the mounting hole, respectively. This leads to good stress and force distribution in the shaft and in the hub member.

An expedient embodiment may additionally be so conceived that the calotte-shaped projections are arranged one after the other in a row. A uniform spaced fit relative to the shaft and the mounting hole, respectively, is established in this way. This leads to a very good stress and force distribution, mounting can be carried out more easily and good true running properties of the shaft are accomplished.

Still another embodiment can be so conceived that several rows of said calotte-shaped projections are arranged in juxtaposition. This has the effect that a press fit is established only in specific areas of the joining surface of the first shaft-hub connection element and of the contact surface of the second shaft-hub connection element. Thin-walled and/or sensitive areas of the component to be positioned are located outside of the pressing zone and are not impaired with respect to their dimensional stability.

In the following, the present invention will be explained in more detail making reference to the drawings, in which.

Figures 1A, 1B:
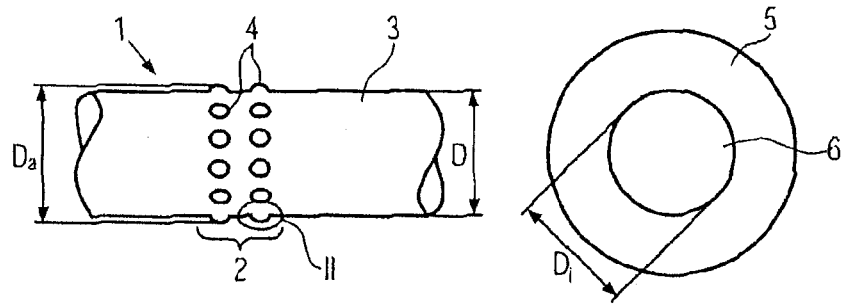
FIG. 1a shows a shaft according to a first embodiment of the invention.
FIG. 1b shows a hub member according to the first embodiment of the invention.
Figure 1C:
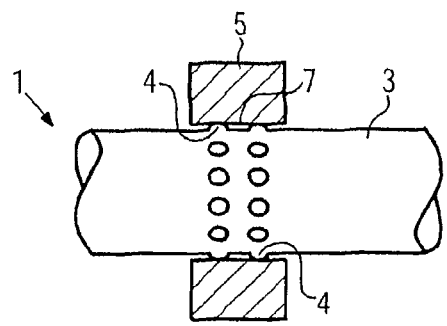
Figure 2:
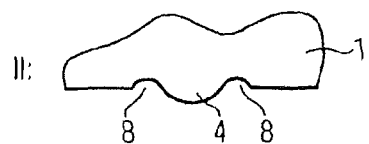
Figures 3A, 3B:
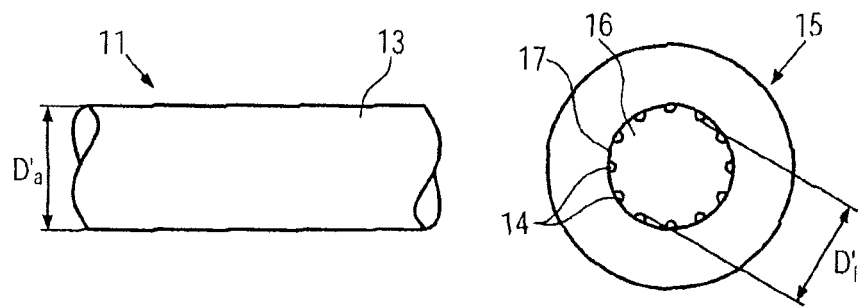
Figure 3C:
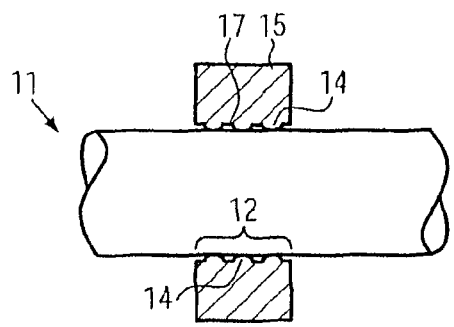

FIG. 1c shows a shaft-hub connection according to the first embodiment of the invention comprising the shaft according to FIG. 1a and the hub member according to FIG. 1b, FIG. 2 shows detail II of FIG. 1a, FIG. 3a shows the shaft according to a second embodiment of the invention, FIG. 3b shows the hub member according to the second embodiment of the invention and FIG. 3c shows the hub member according to the second embodiment of the invention, mounted on the shaft.

FIG. 1a shows a detail of a shaft 1 for a micro motor. Such shafts normally have a diameter of less than 5 mm. The shaft 1 may e.g. be the drive shaft of the rotor of the micro motor. It is here often necessary to position driven elements, such as pinions or toothed belt disks, or ball bearings at a specific point on the drive shaft 1. To this end, the shaft 1 has provided thereon a joining surface 2. The joining surface 2 extends over part of the circumferential surface 3 of the shaft 1. In the area of the joining surface 2, projections 4 are formed on the circumferential surface 3 of the shaft 1. The projections 4 are hill-shaped and have preferably the shape of a calotte. In the embodiment shown, two rows of projections 4 are formed on the shaft 1. In each row the projections 4 are arranged one after the other and distributed over the circumference of the shaft 1, i.e. the projections 4 are located on a circular path extending on the circumferential surface 3 of the shaft 1.

FIG. 1b shows the component 5, which is attached to the shaft 1. This component 5 may e.g. be a pinion, a toothed belt disk or some other driven element. The component 5 may, however, also be configured as a ball bearing. It is provided with a mounting hole 6. Hence, the component 5 is implemented as a hub member.

FIG. 1c shows the shaft 1 and the component 5 in the mounted condition. Part of FIG. 1c is a sectional view of component 5 so that the connection between component 5 and shaft 1 can be shown more clearly. The component 5 is attached to the shaft 1, and the inner surface 7 of the mounting hole 6 of the component 5 rests on the joining surface 2 of the shaft 1. Since the calotte-shaped projections 4 protrude beyond the circumferential surface 3 of the shaft 1, the diameter of said shaft 1 is enlarged in this area. The outer diameter $D_a$ of the shaft 1 on the calotte-shaped projections 4 is larger than the diameter $D_i$ of the mounting hole 6 in component 5. The component 5 must therefore be pushed onto the shaft 1, i.e. the joining surface 2 of the shaft 1, with expenditure of energy. Hence, a press fit is established between component 5 and shaft 1. In the present case "press fit" means that a medium fit or a tight fit is established between the shaft 1 and the mounting hole 6 of the component 5. In the case of the medium fit the component 5 is fixed in position on the shaft 1 by the projections 4, but, subsequently, it must additionally be joined to the shaft 1 through a substance-to-substance bond, i.e. through adhesive bonding, welding or soldering, by way of example. When the outer diameter $D_a$ of the shaft 1 is, in the area of the joining surface 2, large enough for retaining the component 5 by a non-positive connection alone, the connection is referred to as tight fit.

In the case of this embodiment shown in FIG. 1a-1c, the shaft 1 defines a first shaft-hub connection element on which the calotte-shaped projections 4 are formed. A second shaft-hub connection element is defined by component 5, the inner surface 7 of the mounting hole 6 being implemented as a contact surface.

FIG. 2 shows detail II of FIG. 1a. As can be seen from the enlarged representation, recesses 8 are formed next to the calotte-shaped projections 4. The recesses 8 are configured as a circular ring extending around the projections 4.

In FIG. 3a-3c a further embodiment of the shaft-hub connection elements is shown. In the following, only the differences existing in comparison with the first embodiment will be described.

FIG. 3a shows again a detail of a shaft 11 for a micro motor. The shaft 11 has a smooth circumferential surface 13, i.e. the outer diameter $D_a'$ of the shaft 11 is preferably constant over the whole length of the shaft 11.

FIG. 3b shows a component 15 which is implemented as a hub member. As has already been described, this component 15 may be a pinion or a toothed belt disk, i.e. drive elements, or a ball bearing. Just as component 5, also component 15 is preferably rotationally symmetric. Component 15 is provided with a mounting hole 16. The inner surface 17 of the mounting hole 16 has formed thereon calotte-shaped projections 14 which are again surrounded by recesses having the shape of a circular ring (not shown). The calotte-shaped projections 14 project from the inner surface 17 of the mounting hole 16 into the interior of the mounting hole 16. This has the effect that the diameter of the mounting hole 16 is reduced in size. As can be seen in FIG. 3c, the projections 14 are preferably arranged such that they extend in rows along the circumference of the mounting hole 16, i.e. they extend along a circular path. It follows that the inner diameter $D_i'$ of the mounting hole 16 is determined by inwardly protruding projections 14.

FIG. 3c shows the shaft 11 and the component 15 in a mounted condition. The component 15 is attached to the shaft 11 such that it is positioned precisely at the location, i.e. the joining surface provided for this purpose. The outer diameter $D_a'$ of the shaft 11 is larger than the inner diameter $D_i'$ of the mounting hole 16 of component 15, said inner diameter $D_i'$ being determined by the calotte-shaped projections 14. It is here once more possible to select the size or height of the calotte-shaped projections 14 in such a way that the component 15 can either be pushed onto the shaft 11 where it is fixed at the desired position before it is then connected to the shaft by a substance-to-substance bond, or to configure the height or size of the calotte-shaped projections 14 such that the component 15 is joined to the shaft 11 by a non-positive connection through a tight fit.

As can be seen in FIG. 3c, three rows of projections 14 are formed on the inner surface 17 of the mounting hole 16. The projections 14 of a respective row are arranged one after the other so that they extend along a circular path within the hole 16. The circular paths extend preferably parallel to one another. The projections 14 of the individual circular paths may be positioned side by side or arranged such that they are displaced relative to one another. The projections 14 need not be arranged one after the other in rows, the number of projections 14 is selected in accordance with the respective desired joining force. Also the number of rows of projections 14 can be selected as desired.

In the embodiment shown in FIG. 3a-3c, the component 15 is configured as the first shaft-hub connection element, the joining surface being defined by the inner wall of the mounting hole 16 having the calotte-shaped projections 14 arranged thereon. The shaft 11 defines the second shaft-hub connection element whose circumferential surface 13 has formed thereon the contact surface for the component to be fixed 15.

In the following, the method of fixing the component 5 to the shaft 1 will be described making reference to FIG. 1a-1c. First, the circumferential surface 3 of the shaft 1 is partially fused in the area of the joining surface 2, i.e. the material of the shaft 1 will liquefy in these areas. Due to the surface tension of the melt, the melt contracts in the fused areas so that hill-shaped raised portions, viz. the calotte-shaped projections 4, will form. Due to this contraction, an annular recess 8 forms around each calotte-shaped projection 4. Since no additional material is applied, the volume of the recess 8 corresponds to the volume of the calotte-shaped projection 4. The shaft 1 is then cooled down, so that the melt will solidify and the calotte-shaped projections 4 will harden. The calotte-shaped projections 4 then protrude beyond the circumferential surface 3 of the shaft 1. It follows that, due to the calotte-shaped projections 4, the outer diameter $D_a$ of the shaft 1 is larger than the diameter D of the shaft 1 in the non-treated areas.

The component 5 is now slipped onto to the shaft 1. The diameter D of the shaft 1 is slightly smaller than the inner diameter $D_i$ of the mounting hole 6 of component 5. Hence, said component 5 can easily be displaced on the shaft 1. The outer diameter $D_a$ of the shaft 1 on the joining surface 2, in which the calotte-shaped projections 4 are positioned, is larger than the inner diameter $D_i$ of the mounting hole 6 of component 5, i.e. component 5 must be pushed onto the calotte-shaped projections 4 of the shaft 1 with expenditure of energy. When the calotte-shaped projections 4 are deformed in the course of this process, the displaced material can flow into the recesses 8. In the mounted condition, the component 5 rests on the calotte-shaped projections 4 of the shaft.

For partially fusing the shaft 1, a laser beam is preferably used. The laser beam is successively directed onto the points where the calotte-shaped projections 4 are to be formed. The size of the calotte-shaped projections 4 can be determined by varying the power inputted via the laser beam into the shaft. An increase in the power input will result in an increase in the size of the calotte-shaped projections 4, and a reduction of the power input will result in the formation of smaller calotte-shaped projections 4. The necessary mounting force between the component 5 and the shaft 1 can thus be adjusted in dependence upon the number of points irradiated and the power input. Depending on the number of points irradiated and the set laser power, it is thus possible to accomplish a slip joint or a tight fit between the component 5 and the shaft 1. If the calotte-shaped projections 4 are small, so that the outer diameter $D_a$ of the shaft 1 at the calotte-shaped projections 4 is only slightly larger than the inner diameter $D_i$ of the mounting hole 6 of the component 5, a slip joint will be accomplished. The component 5 can then be pushed onto the shaft 1 and is retained on said shaft 1 via the calotte-shaped projections 4. In order to obtain a firm connection between the shaft 1 and the component 5, the component 5 can then additionally be joined to the shaft 1 by adhesive bonding, welding or soldering. In this case, the component 5 is additionally joined to the shaft 1 through a substance-to-substance bond.

If a higher number of calotte-shaped projections 4 is provided or if the calotte-shaped projections 4 are larger, a tight fit will be established when the component 5 is slipped onto the shaft 1. The component 5 is then joined to the shaft 1 through a non-positive connection, an additional connection between the component 5 and the shaft 1 being then not necessary.

In the embodiment shown in FIG. 1a-1c, two juxtaposed rows of calotte-shaped projections 4 are formed. In each row, the calotte-shaped projections 4 are arranged such that they are disposed one after the other and distributed over the circumference of the shaft 1, i.e. the calotte-shaped projections 4 are located on a circular path in each row. The embodiment may also be so conceived that only individual calotte-shaped projections are produced, only one row of calotte-shaped projections 4 is produced, or the projections 4 are arranged in an arbitrary manner on the shaft. In this respect, it is preferably taken into account whether the component 5 comprises thin-walled and/or sensitive areas which must not have applied thereto any loads. If this should be the case, the calotte-shaped projections 4 are configured such that these thin-walled and/or sensitive areas are located outside of the pressing zone and are not impaired with respect to their dimensional stability.

A further variant of the manufacturing method is described making reference to FIG. 3a-3c. According to this second variant, the calotte-shaped projections 14 are formed not on the shaft but on component 15. As can be seen from FIG. 3a, the shaft 11 is not treated. Instead, the inner surface 17 of the mounting hole 16 of component 15 is partially fused. Due to the surface tension of the melt, the melt contracts at the fused locations, i.e. calotte-shaped projections 14 will form. The projections 14 are surrounded by recesses (not shown). Just as in the case of the method described hereinbefore, the calotte-shaped projections 14 are spaced apart, so that the melt can contract locally. Also in this case, a laser beam can be used for fusing the material. The inner surface 17 of the mounting hole 16 of component 15 is then irradiated with a laser beam at certain points. At the points irradiated, the material of component 15 will melt and contract thus forming the calotte-shaped projections 14.

As can be seen from FIG. 3b, a plurality of locations, which are distributed over the circumference of the mounting hole 16, are fused by the laser beam. The power supplied to component 15 through the laser beam is adjusted such that calotte-shaped projections 14 having the desired size are formed. If more power is supplied, larger areas will be fused and larger projections 14 will be formed. If less power is supplied, smaller areas will be fused and smaller projections 14 will be formed. A plurality of projections 14, which are distributed over the circumference of the mounting hole 16, can be produced. Through the power supplied and through the number of fused locations, the desired change in the circumference of the mounting hole 16 can be achieved. The distance between two respective neighbouring projections 14 is preferably identical so that said projections 14 are uniformly distributed over the circumference of the mounting hole 16.

FIG. 3c shows that the projections 14 are formed in juxtaposed rows. In the case shown, three rows of projections 14 are formed. The number of rows is, however, variable.

After partially fusing the inner surface 17 of the mounting hole 16, component 15 is cooled down so that the calotte-shaped projections 14 will solidify. The inner diameter $D_i'$ of the mounting hole 16 defined by the calotte-shaped projections 14 will then be smaller than the outer diameter $D_a'$ of the shaft 11. Subsequently, the component 15 is slipped onto the shaft 11 and positioned precisely at the desired location. The mounting force used for fixing the component 15 to the shaft 11 can be adjusted by selecting a suitable number of projections 14 in combination with a suitable size of the projections 14. Said mounting force can, for example, be adjusted such that the component 15 can still be displaced on the shaft 11 with a minor expenditure of energy. The component 15 is then slipped onto the shaft 11 and positioned at the desired location. Due to the projections 14, the component 15 is fixed in position on the shaft 11. Subsequently, the component 15 is additionally joined to the shaft 11 through adhesive bonding, welding or soldering, so that an additional substance-to-substance bond will be established.

The number of projections 14 and/or the size of the projections 14 may, however, also be conceived such that the component 15 can only be slipped onto the shaft 11 with a higher expenditure of energy. In this case, the component 15 will be retained on the shaft 11 by a tight fit.

In view of the fact that a laser is used for producing the projections on the shaft or in the mounting hole 16 of component 15, the shape and the position of the projections can be adjusted very easily.

The invention claimed is:

1. A method of establishing a press fit of a component with a mounting hole on a shaft, comprising:
    partially fusing an inner surface of the mounting hole of the component so that calotte-shaped projections protruding beyond the inner surface of the mounting hole will form,
    cooling the component, so that the calotte-shaped projections will solidify, and
    slipping the component onto the shaft until the mounting hole is positioned in a fastening area of the shaft.

2. The method according to claim 1, wherein at least one of the component or the shaft is irradiated with a laser beam at certain points thereof for fusing.

3. The method according to claim 2, wherein the supply of power by the laser beam is adjusted to control a size of the calotte-shaped projections.

4. The method according to claim 1, wherein the inner surface of the mounting hole of component and/or the circumferential surface of the shaft are fused at a plurality of points.

5. The method according to claim 1, wherein the component is additionally bonded to the shaft.

6. The method according to claim 1, wherein the calotte-shaped projections are arranged such that they are distributed over a circumference of the mounting hole and of the shaft, respectively.

7. The method according to claim 1, wherein a plurality of juxtaposed rows of calotte-shaped projections is formed in the mounting hole or on the shaft.

8. The method according to claim 1, comprising
forming a plurality of annular recesses in the inner surface of the mounting hole of the component, each of the annular recesses surrounding one of the calotte-shaped projections.

9. A method of establishing a press fit of a component with a mounting hole on a shaft, comprising:
partially fusing a circumferential surface of the shaft so that calotte-shaped projections protruding beyond the circumferential surface of the shaft will form,
cooling the shaft, so that the calotte-shaped projections will solidify, and
slipping the component onto the shaft until the mounting hole is positioned in a fastening area of the shaft.

10. The method according to claim 9, comprising:
forming a plurality of annular recesses in the circumferential surface of the shaft, each of the annular recesses surrounding one of the calotte-shaped projections.

11. A method of establishing a press fit of a component with a mounting hole on a shaft, comprising:
partially fusing an inner surface of the mounting hole of the component and a circumferential surface of the shaft so that calotte-shaped projections protruding beyond the inner surface of the mounting hole and the circumferential surface of the shaft will form,
cooling the component and the shaft, so that the calotte-shaped projections will solidify, and
slipping the component onto the shaft until the mounting hole is positioned in a fastening area of the shaft.

12. The method according to claim 11, comprising:
forming a plurality of first annular recesses in the inner surface of the mounting hole of the component and a plurality of second annular recesses in the circumferential surface of the shaft, each of the first annular recesses surrounding one of the calotte-shaped projections formed in the inner surface of the mounting hole, and each of the second annular recesses surrounding one of the calotte-shaped projections formed in the circumferential surface of the shaft.

13. A shaft-hub connection element comprising:
a joining surface for establishing a partially fused press fit with a second shaft-hub connection element having a partially fused contact surface; and
calotte-shaped projections protruding beyond the contact surface of the shaft-hub connection element which are formed in an area of the joining surface,
wherein the calotte-shaped projections are solid projections of the partially fused contact surface of the shaft-hub connection element.

14. The shaft-hub connection element according to claim 13, wherein the shaft-hub connection element is a shaft for a micro motor, the joining surface with the calotte-shaped projections being formed on a circumferential surface of the shaft, and the second shaft-hub connection element being a hub member with a mounting hole configured as a contact surface.

15. The shaft-hub connection element according to claim 13, wherein the shaft-hub connection element is a hub member, the joining surface with the calotte-shaped projections being formed in the interior of a mounting hole, and that the second shaft-hub connection element being a shaft having the contact surface formed on its circumferential surface.

16. The shaft-hub connection element according to claim 13, wherein the calotte-shaped projections are distributed over a circumference of the shaft and of a mounting hole of the hub member, respectively.

17. The shaft-hub connection element according to claim 13, wherein the calotte-shaped projections are arranged one after another in a row.

18. The shaft-hub connection element according to claim 13, wherein several rows of said calotte-shaped projections are arranged in juxtaposition.

19. The shaft-hub connection element according to claim 13, comprising:
a plurality of annular recesses formed in the joining surface of the shaft-hub connection element, each of the annular recesses surrounding one of the calotte-shaped projections.

20. The shaft-hub connection element according to claim 13, wherein at least some of the calotte-shaped projections are spaced apart along an axial direction of the shaft-hub connection element.

* * * * *